United States Patent  [15] 3,674,705
Hytrek  [45] July 4, 1972

[54] NON-MASSING DIARYL-P-PHENYLENE DIAMINES

[72] Inventor: Frederick Paul Hytrek, Wilmington, Del.
[73] Assignee: E. I. du Pont de Nemours and Company, Wilmington, Del.
[22] Filed: July 30, 1969
[21] Appl. No.: 846,275

[52] U.S. Cl..............................252/400, 252/384, 252/401, 252/428, 260/45.9 R
[51] Int. Cl....................................C08d 11/04, C08g 51/60
[58] Field of Search...............252/401, 400, 426, 428, 384; 260/45.9 R

[56] References Cited

UNITED STATES PATENTS

| | | | |
|---|---|---|---|
| 3,304,285 | 2/1967 | Cox | 252/401 |
| 3,507,826 | 4/1970 | Lal et al. | 252/401 |

FOREIGN PATENTS OR APPLICATIONS

| | | |
|---|---|---|
| 1,128,388 | 9/1968 | Great Britain |
| 1,526,506 | 4/1968 | France |

Primary Examiner—Leon D. Rosdol
Assistant Examiner—Irwin Gluck
Attorney—Vernon R. Rice

[57] ABSTRACT

A non-massing antiozonant for chloroprene polymer rubbers prepared by mixing a finely divided inorganic material having a high surface area and a high oil absorption capacity with a diaryl-p-phenylene diamine composition. The diaryl-p-phenylene diamine is molten during the mixing operation. The antiozonant is highly resistant to caking and maintains its free-flowing particulate form during normal conditions of storage and use.

10 Claims, No Drawings

NON-MASSING DIARYL-P-PHENYLENE DIAMINES

BACKGROUND OF THE INVENTION

In handling granular or pulverulent organic chemical compounds a frequently encountered problem is that of massing, a tendency of particles of the compound to adhere to each other so that the mass of material is in the form of a solid cake rather than its original, easily handled particulate form. This problem is especially bothersome in the compounding of rubber, where it is necessary to dispense relatively small charges of many different ingredients in the preparation of each batch of a rubber formulation.

A common solution to the massing problem is the physical blending of the particulate organic material with any of a great variety of finely divided, usually inorganic solids such as clays, talc, chalk, diatomaceous earth, silicas, silicates, and the like. This expedient is quite adequate to solve the massing problem with many organic materials. Even this method fails, however, with more intransigent organic materials, such as those that have a wide melting point range because they are mixtures of different or related compounds or because they include tarry or oily components.

Representative of such organic materials are certain of the diaryl-p-phenylene diamines made by the condensation of hydroquinone with o-toluidine and a mixture of alkyl anilines in the presence of an aluminum chloride and/or ferric chloride catalyst. These products are superior antiozonants for polychloroprene synthetic rubbers; however, they have a severe massing tendency, which is not solved by physical blending with the usual absorbent solids.

SUMMARY OF THE INVENTION

This invention provides a free-flowing, non-massing antiozonant composition prepared by mixing about 100 parts by weight of a molten diaryl-p-phenylene diamine with about 2–20 parts by weight of a finely divided inert inorganic solid having a surface area of about 40–200 square meters per gram and an oil absorption capacity of about 200–600 percent and solidifying the mass by cooling. The product is then crushed and ground to the desired particle size. The diaryl-p-phenylene diamine is the condensation product of about one mole of hydroquinone with at least about two moles of an amine mixture consisting essentially of about 70–90 percent by weight o-toluidine and about 30–10 percent by weight of an alkyl phenyl amine composition consisting essentially of ring-substituted dimethyl anilines or mixtures of dimethyl anilines and ethyl anilines, with the proviso that at least about 65 percent by weight of said phenyl amine composition is one or more xylidine.

DETAILED DESCRIPTION

The inorganic solids used to improve the form of the diaryl-p-phenylene diamines can be any inert inorganic material having a surface area of about 40–200 square meters per gram, with a high capacity for absorbing oil, i.e., 200 to 600 percent of oil based on the weight of the inorganic solid. By "inert" is meant that the inorganic solid will not react with the diaryl-p-phenylene diamine or interfere with its antiozonant properties. Suitable inorganic solids include clays (such as the Kaolin clays), precipitated calcium carbonates, carbon blacks, colloidal silicas and synthetic colloidal silicates. The preferred solids are the synthetic hydrous calcium silicates that are commonly used in compounding rubbers, paints, printing inks, and the like. Representative of such synthetic hydrous calcium silicates are a class of materials containing about 49–55 percent by weight silica ($SiO_2$), 22–28 percent by weight lime ($CaO$), 14–19 percent by weight water and the remainder is small quantities of alumina ($Al_2O_3$), iron oxide ($Fe_2O_3$), magnesia ($MgO$) and alkalis ($Na_2O + K_2O$) in varying amounts. These preferred inorganic materials are sold commercially under the trade name "Micro-Cel". They are prepare by the hydrothermal reaction of crude diatomaceous silica (diatomite), hydrated lime and water.

The surface area values described herein are determined by the standard Brunauer, Emmett and Teller nitrogen absorption system. The oil absorption capacities of the inorganic solid are determined as follows: A 10-gram sample weighed to the nearest 0.01 gm is placed in a casserole. Filtered raw linseed oil is added drop by drop from a burette at rate of one drop per second. The pigment is continually "shoveled lightly" with a spatula in such a manner that each oil drop falls on a dry portion. When the particles become wet, they coalesce and form small lumps. These lumps are distributed throughout the mass using a minimum of stirring and no pressure. As the absorption of oil progresses, the small lumps start to form larger balls. At this point one drop of oil is added, very slowly, onto the surface of the lumps, not the dry powder. After each addition, the lumps are stirred around, picking up the dry powder. When all the dry powder has been wet and picked up, the paste lump smears on the sides of the casserole. This is the end point. The milliliters of oil used is multiplied by 10 and this product multiplied by the specific gravity of the oil to give the number of grams of oil absorbed by 100 grams of powder. This number is reported as the percent oil absorption.

The diaryl-p-phenylene diamine mixtures with which the inorganic materials are mixed are condensation products of one mole of hydroquinone with at least about 2 moles of an amine mixture containing about 70–90 percent by weight o-toluidine and about 30–10 percent by weight of an alkyl phenyl amine composition consisting essentially of ring substituted dimethyl anilines or mixtures of dimethyl and ethyl anilines. Any proportions of the dimethyl or ethyl anilines can be used so long as at least 65 percent by weight of the composition is at least 1 xylidine. Any one or combination of more than one of the xylidine isomers can be used to make up the required amount. Particularly preferred alkyl phenyl amine compositions are those sold commercially as mixed xylidines by various chemical suppliers. These compositions consist essentially of differing proportions of xylidine isomers, ethyl aniline and minor quantities of other alkyl phenyl amines. They are prepared by nitration and subsequent reduction of technical xylene. They have a specific gravity of 0.97–1.00 and a boiling range at atmospheric pressure of about 200°–230° C. The condensation product of these amines and hydroquinones is thus a complex mixture of diaryl-p-phenylene diamines referred to herein simply as "diaryl-p-phenylene diamine".

While more than two moles of the amine mixture can be used in carrying out the condensation, there is little practical advantage to be gained in the use of more than a minor excess of amine. Use of a large excess makes it necessary to remove and, preferably, to recover the excess amine. In practice, it has been found advantageous to use a 10–20 percent excess of amine. Any of the well-known condensation catalysts can be used, such as metal halides, phosphoric acid, sulfuric acid, and toluenesulfonic acid. The preferred catalyst is a mixture of aluminum chloride and ferric chloride. The temperature of the reaction ranges between 175° C. and 325° C., preferably between 200° and 260° C. The reaction is complete when no more water is evolved. Usually a heating period of eight to 24 hours suffices, although the reaction time will depend on the temperature. Unreacted amine is separated from the reactants by distillation.

The method of the present invention involves mixing the finely divided inorganic solid with the diaryl-p-phenylene diamine in the molten state. A temperature of at least about 120° C. is ordinarily adequate to melt the diaryl-p-phenylene diamine. The inorganic solid can be added to the molten diamine after synthesis is complete or can be added with the reaction ingredients before condensation to the diamines is carried out. It is essential that the inorganic solid and molten diaryl-p-phenylene diamine be combined while the latter is in the liquid state.

After the mixture is prepared, it is converted to final particulate form by solidification in any convenient container, crushing to manageable size, and grinding in any suitable equipment to the desired particle size. For use in rubber compounding, a particle size of 20 mesh or less is generally quite suitable.

The mixtures of this invention once reduced to a granular or pulverulent form have excellent resistance to massing or agglomeration. They can be readily handled and incorporated into a chloroprene polymer rubber stock during compounding. Surprisingly, intimate physical mixing of solid diaryl-p-phenylene diamines of the types described herein with finely divided absorbent organic solids is relatively ineffective in preventing massing of the product under storage conditions.

The invention will be further illustrated by the following examples wherein parts and percentages are by weight unless otherwise indicated.

EXAMPLE 1

A diaryl-p-phenylene diamine composition is prepared as follows. A one-liter electrically heated flask equipped with an agitator and an offset vapor take-off line leading to a water-cooled condenser is used. The condensed vapors are collected in a decanter, from which the water layer is intermittently removed and the organic phase is continuously returned to the reactor. Prior to heating, the following materials are charged to the reactor:

| | |
|---|---|
| Phenyl amine composition | 73 grams |
| o-Toluidine | 290 grams |
| Hydroquinone | 165 grams |
| Aluminum chloride | 7 grams |
| Ferric chloride | 2 grams |

The phenyl amine composition used is a technical grade product sold as "Xylidines Mixed o-m-p Technical" by Du Pont. It has the following analysis:

| | Percent by Weight |
|---|---|
| Toluidines | 0.35 |
| 2-Ethylaniline | 7.4 |
| 4-Ethylaniline | 5.5 |
| 2,4-Xylidine | 50.9 |
| 2,6-Xylidine | 14.0 |
| 3,5-Xylidine | 1.3 |
| 2,5-Xylidine | 11.6 |
| 2,3-Xylidine | 5.4 |
| 3,4-Xylidine | 3.4 |

The purity of the phenyl amine composition as determined by the sodium nitrite test is 99 percent minimum.

The mixture is heated until reflux appears (212° C.). Heating is continued and the temperature slowly rises to a final temperature of 252° C. The total heating time is 12 hours. When no more water appears in the condensate, vacuum is applied at 252° C. to remove any low-boiling materials. The product is cast in an aluminum pan and allowed to cool and crystallize overnight. It is a solid, having a melting range of 100°–110° C.

To about 45 parts by weight of diaryl-p-phenylene diamine prepared as described above is added about 4.9 parts by weight of a hydrous calcium silicate having a surface area of 95 square meters per gram and an oil absorption capacity of 490 weight percent. ("Micro-Cel E")* (* "Micro-Cel E" has the following typical chemical analysis, in percent by weight: $SiO_2$, 54.3; CaO, 25.1; Alumina, 3.6; Iron Oxide, 1.2; Magnesia, 3.0; Alkalies, 1.3 and Ignition Loss, 14.0. It is prepared by the hydrothermal reaction of crude diatomaceous silica (diatomite), hydrated lime and water.) The mixture is heated to 120° C. at which temperature the diamine mixture is completely molten and the resulting mixture is stirred until the calcium silicate is completely dispersed therein.

The mixture is poured into an aluminum pan and allowed to solidify after which it is broken into small chunks, ground in a mortar and sieved so that all product passes a 20–mesh screen. A sample of this product is placed in a cylindrical glass container, and the sample is compressed by a slightly smaller, weighted glass cylinder such that a pressure of about 0.65 lbs.sq. in. is applied, simulating loading conditions expected in normal storage of such a product. The entire assembly is held in a circulating air oven for extended periods to simulate temperatures that are experienced in summer warehouse storage.

For comparison, samples of the particulate diaryl-p-phenylene diamines (Samples 2 and 3) that are mechanically mixed with the hydrous calcium silicate without melting are similarly tested. Results are as follows:

| Sample No. | % Calcium Silicate (calculated) | Oven Temp. °C. | Time in oven, days | Massing Behavior |
|---|---|---|---|---|
| 1 | 10% | 45 | 25 | Free flowing |
| 2 (control) | 5% | 35 | 22 | Heavy caking |
| 3 (control) | 10% | 45 | 22 | Heavy caking |

EXAMPLE 2

Three samples of mixtures of diaryl-p-phenylene diamines and hydrous calcium silicate are prepared by mixing varying concentrations of the calcium silicate with a diaryl-p-phenylene diamine using the same materials and procedures as described in Example 1. The control samples (4 and 5) are prepared by mixing the hydrous calcium silicate with solid diaryl-p-phenylene diamine. The solidified mixtures are crushed into small chunks and ground in an Abbe cutter operating at 965 rpm using a ⅛ inch screen. The ground products are tested for massing behavior as in Example 1. Results are as follows:

| Sample No. | % Calcium Silicate (Calculated) | oven Temp. °C. | Time in oven, days | Massing Behavior |
|---|---|---|---|---|
| 1 | 7 | 45 | 36 | Free flowing |
| 2 | 10 | 45 | 36 | Free flowing |
| 3 | 12 | 45 | 36 | Free flowing |
| 4 (control) | 5 | 45 | 2 | Heavy caking |
| 5 (control) | 10 | 45 | 22 | Heavy caking |

EXAMPLE 3

A diaryl-p-phenylene diamine composition is prepared from the following ingredients using the procedure described in Example 1:

220 parts hydroquinone
7 parts aluminum chloride, anhydrous
2 parts ferric chloride
412 parts o-toluidine
103 parts phenyl amine composition described in Example 1
43 parts synthetic hydrous calcium silicate ("Micro-Cel E" described in Example 1)

The molten reaction product, which contains 8 percent of calcium silicate, is crushed and ground to give an antiozonant product suitable for use in compounding rubber. It is highly resistant to massing in storage.

What is claimed is:

1. A process for improving the physical form of a diaryl-p-phenylene diamine which is prepared by condensing one mole of hydroquinone with at least about two moles of an amine mixture containing about 70–90 percent by weight o-toluidine and about 30–10 percent by weight of mixed xylidines, said process consisting essentially of mixing about 100 parts by weight of molten diaryl-p-phenylene diamine with about 2–20 parts by weight of a finely divided hydrous calcium silicate having a surface area of about 40–200 square meters per gram and an oil absorption capacity of about 200–600 percent and allowing the mixture to solidify by cooling.

2. A process of claim 1 wherein the hydrous calcium silicate has a surface area of about 95–175 square meters per gram, an oil absorption capacity of about 220–490 square meters per gram and is used in the amount of about 5–15 parts by weight per 100 parts by weight of diaryl-p-phenylene diamine.

3. A process of claim 1 wherein the hydrous calcium silicate consists essentially of, in parts by weight, about 49–55 percent silicon dioxide, 22–28 percent calcium oxide and 13–19 percent water.

4. A process of claim 1 wherein the diaryl-p-phenylene diamine is prepared by condensing 1 mole of hydroquinone with about two moles of an amine mixture consisting essentially of about 78–82 percent by weight o-toluidine and 18–22 percent by weight of an amine mixture consisting essentially of dimethyl anilines or mixtures of dimethyl anilines and ethyl anilines, said anilines being present in any proportions with the proviso that at least about 65 percent by weight of said alkyl phenyl amine composition is at least one xylidine and the resulting solid diaryl-p-phenylene diamine is reduced to the desired particle size by crushing and grinding.

5. A process of claim 4 wherein the hydrous calcium silicate consists essentially of, in parts by weight, about 49–55 percent silicon dioxide, 22–28 percent calcium oxide, 13–19 percent water, and the remainder is iron oxide ($Fe_2O_3$), magnesium oxide (MgO), sodium oxide ($Na_2O$) and potassium oxide ($K_2O$) in varying proportions.

6. A non-massing antiozonant composition prepared by mixing a diaryl-p-phenylene diamine and hydrous calcium silicate as described in claim 1.

7. A non-massing antiozonant composition prepared by mixing a diaryl-p-phenylene diamine and hydrous calcium silicate as described in claim 2.

8. A non-massing antiozonant composition prepared by mixing a diaryl-p-phenylene diamine and hydrous calcium silicate as described in claim 3.

9. A non-massing antiozonant composition prepared by mixing a diaryl-p-phenylene diamine and hydrous calcium silicate as described in claim 4.

10. A non-massing antiozonant composition prepared by mixing a diaryl-p-phenylene diamine and hydrous calcium silicate as described in claim 5.

* * * * *